United States Patent
Paisley

(10) Patent No.: US 6,613,111 B2
(45) Date of Patent: Sep. 2, 2003

(54) SMALL SCALE HIGH THROUGHPUT BIOMASS GASIFICATION SYSTEM AND METHOD

(75) Inventor: Mark A. Paisley, Columbus, OH (US)

(73) Assignee: Future Energy Resources Corporation, Norcross, GA (US)

( * ) Notice: Subject to any disclaimer, the term of this patent is extended or adjusted under 35 U.S.C. 154(b) by 0 days.

(21) Appl. No.: 09/990,669

(22) Filed: Nov. 16, 2001

(65) Prior Publication Data

US 2002/0078867 A1 Jun. 27, 2002

Related U.S. Application Data

(60) Provisional application No. 60/249,634, filed on Nov. 17, 2000.

(51) Int. Cl.[7] .............................. C10B 1/00; C10B 1/02; C10J 8/00; F27B 5/00
(52) U.S. Cl. ..................... 48/89; 422/139; 422/141; 422/145; 422/146; 422/147; 422/198; 422/202; 422/204; 201/13; 201/31; 201/32
(58) Field of Search ................... 422/139, 141, 422/145, 146, 147, 188, 191, 196, 197, 198, 201, 202, 204; 48/61, 89, 101, 102 R, 111; 201/7, 13–16, 21–24, 27, 31, 32

(56) References Cited

U.S. PATENT DOCUMENTS

| | | | |
|---|---|---|---|
| 4,828,581 A | * | 5/1989 | Feldmann et al. ........ 48/197 R |
| 5,494,653 A | | 2/1996 | Paisley |
| 5,580,362 A | | 12/1996 | Manulescu et al. |
| 5,730,763 A | | 3/1998 | Manulescu et al. |
| 5,900,224 A | | 5/1999 | Fujimura et al. |
| 6,048,374 A | * | 4/2000 | Green ........................ 48/209 |
| 6,074,769 A | | 6/2000 | Johnssen |
| 6,133,328 A | | 10/2000 | Lightner |

* cited by examiner

Primary Examiner—Jerry D. Johnson
Assistant Examiner—Alexa S. Doroshenk
(74) Attorney, Agent, or Firm—Troutman Sanders LLP; Ryan A. Schneider, Esq.

(57) ABSTRACT

A process and method is provided for operating a small-scale high-throughput gasifier. As is known in the art, the exothermic combustion reactions can be separated from the endothermic gasification reactions. The exothermic combustion reactions can take place in or near the combustor while the endothermic gasification reactions take place in the gasifier. Heat from the exothermic zone is transferred to the endothermic reaction zone by circulation of an inert particulate solid such as sand. In order to increase efficiency by reducing heat loss from the gasifier, the gasifier is concentrically-disposed within the endothermic reaction zone of the combustor.

20 Claims, 3 Drawing Sheets

Effect of Smaller Sizes
Conventional Systems

SMALL SCALE HIGH THROUGHPUT BIOMASS GASIFICATION SYSTEM AND METHOD

CROSS-REFERENCE TO RELATED APPLICATIONS

This application claims priority from U.S. Provisional Patent Application Ser. No. 60/249,634, filed Nov. 17, 2000.

BACKGROUND OF THE INVENTION

1. Field of Invention

This invention relates to gasifiers as applied to biomass gasification, and more particularly to a small scale high-throughput gasification system using a high efficiency parallel entrained bed pyrolysis unit.

2. Description of Related Art

Fluidized bed gasifier/combustor systems having separate gasifiers and combustor vessels that allow exothermic combustion reactions to be separated from the endothermic gasification reactions, are known in the art. For example, U.S. Pat. No. 3,853,498 to Bailie, describes a process involving separate gasification and combustion zones. In the Bailie process, both zones are conventional fluid-bed reactors. Published wood throughput values for the Bailie process typically do not exceed 120 lbs/ft$^2$-hr. Fluidization would occur typically with inlet gas velocities 1–3 ft/sec to provide good fluidization. Since the Bailie process employs conventional fluid-beds, transfer of circulating sand is by direct flow from fluid-bed to fluid-bed rather than by entrainment and exit out the top of the reaction vessel.

U.S. Pat. No. 4,032,305 to Squires discloses another circulating bed gasifier for coal and coke gasification known as a "fast fluid-bed". The fast fluid-bed can operate in a two-zone configuration of an exothermic combustion zone and an endothermic gasification zone. Squires states that the minimum velocity needed to achieve a circulating fast fluid-bed is a little more than 6 ft/sec with particles having an average diameter of 60 microns. Squires prefers operating with particles no larger than 250 microns.

U.S. Pat. No. 4,828,581 to Feldmann et al. described a novel method of operating a gasifier for production of fuel gas from carbonaceous fuels wherein biomass is gasified at very high wood throughputs in a fluidized bed gasifier operating at low inlet gas velocities. The process relies upon the entrainment of inert solids in a parallel entrained bed pyrolysis process to allow operation at an inlet velocity of as low as 0.5 ft/sec but with a wood throughput from 500 to 4400 lbs/ft$^2$-hr. The lbs/ft$^2$-hr relates to the gasifier diameter by referring to the cross-sectional area of the gasifier.

As illustrated in FIG. 1, the efficiency of the each of these prior systems increases with increasing input of feedstock material. At low inputs the percentage of heat loss increases exponentially, effectively limiting prior systems to inputs of greater than approximately 100 tons per day. If throughput is defined as the ratio of input to cross section, then at high throughputs the curve illustrated in FIG. 1 shifts to the right, becoming even less favorable and requiring a higher overall system input to maintain an acceptable level of efficiency. Accordingly, previous high throughput systems have been limited to operation at feedstock input rates of greater than approximately 100 tons per day.

However, there are many applications wherein in it is impractical to maintain high feedstock input rate on the order of 100 tons per day, such as to provide power small communities or industrial facilities having low power requirements. It would clearly be desirable to operate these systems at a higher throughput because the resulting gasifier unit could be both smaller and cheaper to construct than a conventional low-throughput gasifier of the same capacity. Prior conventional gasifier systems have required a tradeoff between unit cost and efficiency.

Accordingly, there is a need for a biomass gasification system which allows for a relatively low total feedstock input rate while maintaining a high-throughput.

SUMMARY OF THE INVENTION

The process system according to this invention relates to production of gas by use of a high throughput combination gasifier and combustor, wherein the exothermic combustion reactions can take place in or near the combustor while the endothermic gasification reactions take place in the gasifier. Heat from the exothermic reaction zone of the combustor is transferred to the endothermic reaction zone of the gasifier by circulation of an inert particulate solid such as sand. In order to increase efficiency by reducing heat loss from the gasifier, the gasifier is concentrically-disposed within the endothermic reaction zone of the combustor.

DETAILED DESCRIPTION OF THE INVENTION

The basic method of operating a parallel entrained bed pyrolysis unit is similar to that disclosed in U.S. Pat. No. 4,828,581 to Feldmann et al., incorporated fully herein by reference. The gasifier system A of the present invention is adapted to use any of a wide variety of biomass feedstocks. As used herein, the term biomass feedstock can be considered to include, for example and not limitation: wood, grasses, agricultural debris, manure, waste paper, peat, and coals such as young lignitic coal. One of ordinary skill in the art will realize that any of a number of other carbonaceous materials are also suitable for use as biomass feedstock in the gasifier of the present invention.

Gasifier system A generally includes a gasifier 102 and a combustor 118 that operate in conjunction with one another to produce medium BTU gas and/or heat to drive a steam turbine. Gasifier 102 acts to pyrolytically convert a portion of the organic materials comprising the biomass feedstock to gases such as methane, carbon monoxide, carbon dioxide and hydrogen by heating the biomass feedstock in a non-oxidizing environment. Combustor 118 acts a source of heat for driving the gasification reactions in gasifier 102. Generally, gasifier 102 and combustor 118 transfer heat and materials to each other via the circulation of a particulate inert material, such as sand, which can be fluidized by a flow of gas therethough. To further increase the efficiency of gasifier system A, it is advantageous to position gasifier 102 concentrically within combustor 118 to minimize the heat losses from the surface of gasifier 102.

Figure 1:
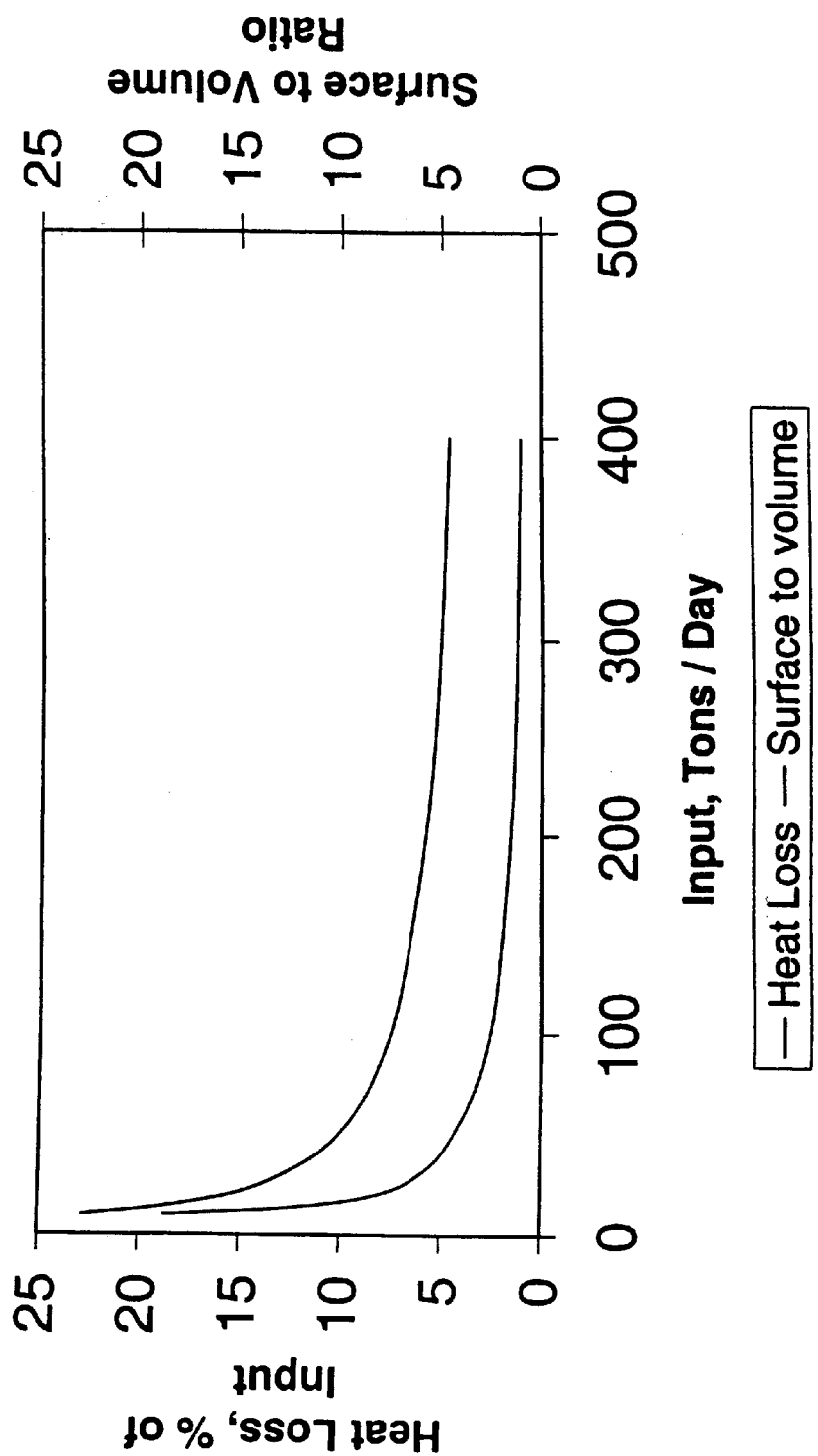
FIG. 1 is a graphical representation of the relationship between the overall biomass input of a conventional biomass gasifier to the percentage heat loss and the required surface area to volume ratio of the gasifier.
Figure 2:
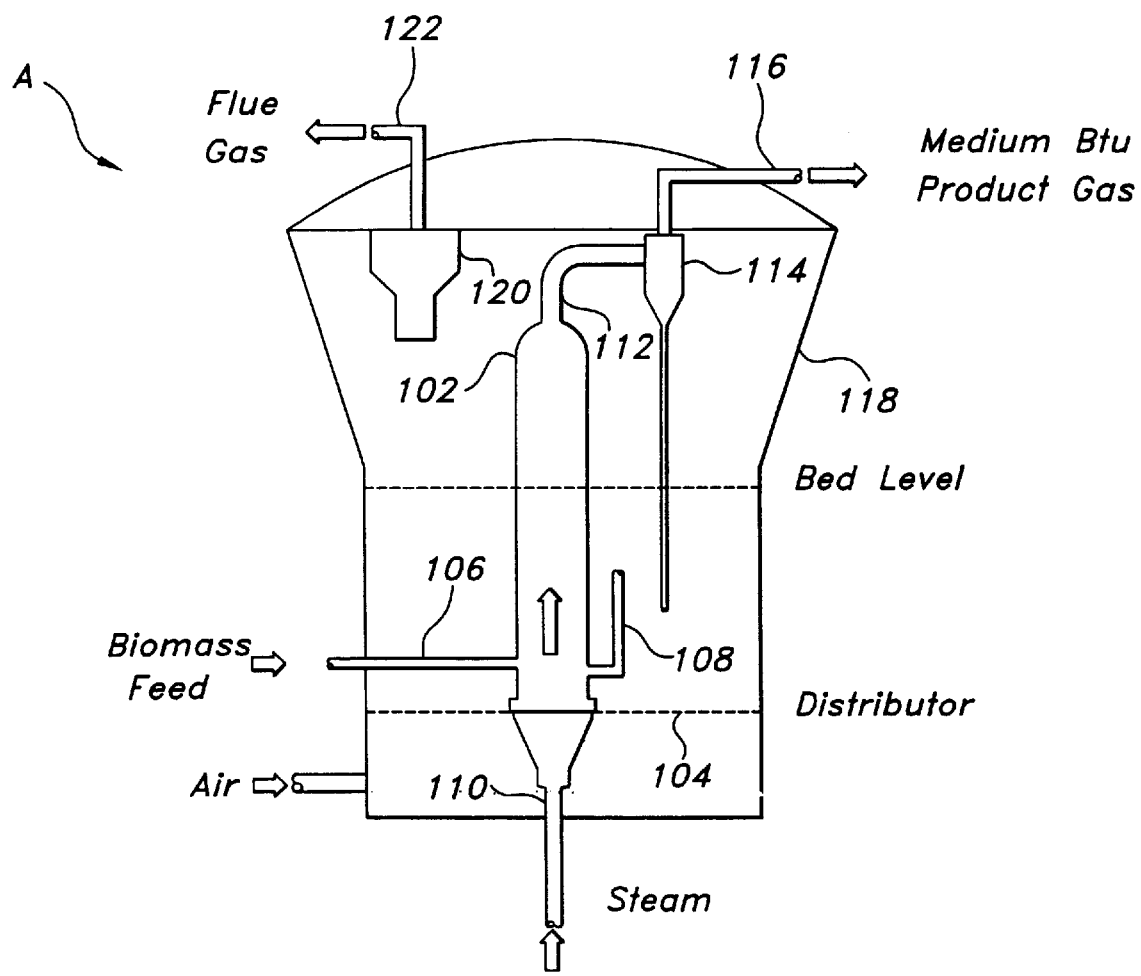
FIG. 2 illustrates a side view of a gasifier system useful in the process according to a preferred embodiment of the present invention.
Figure 3:
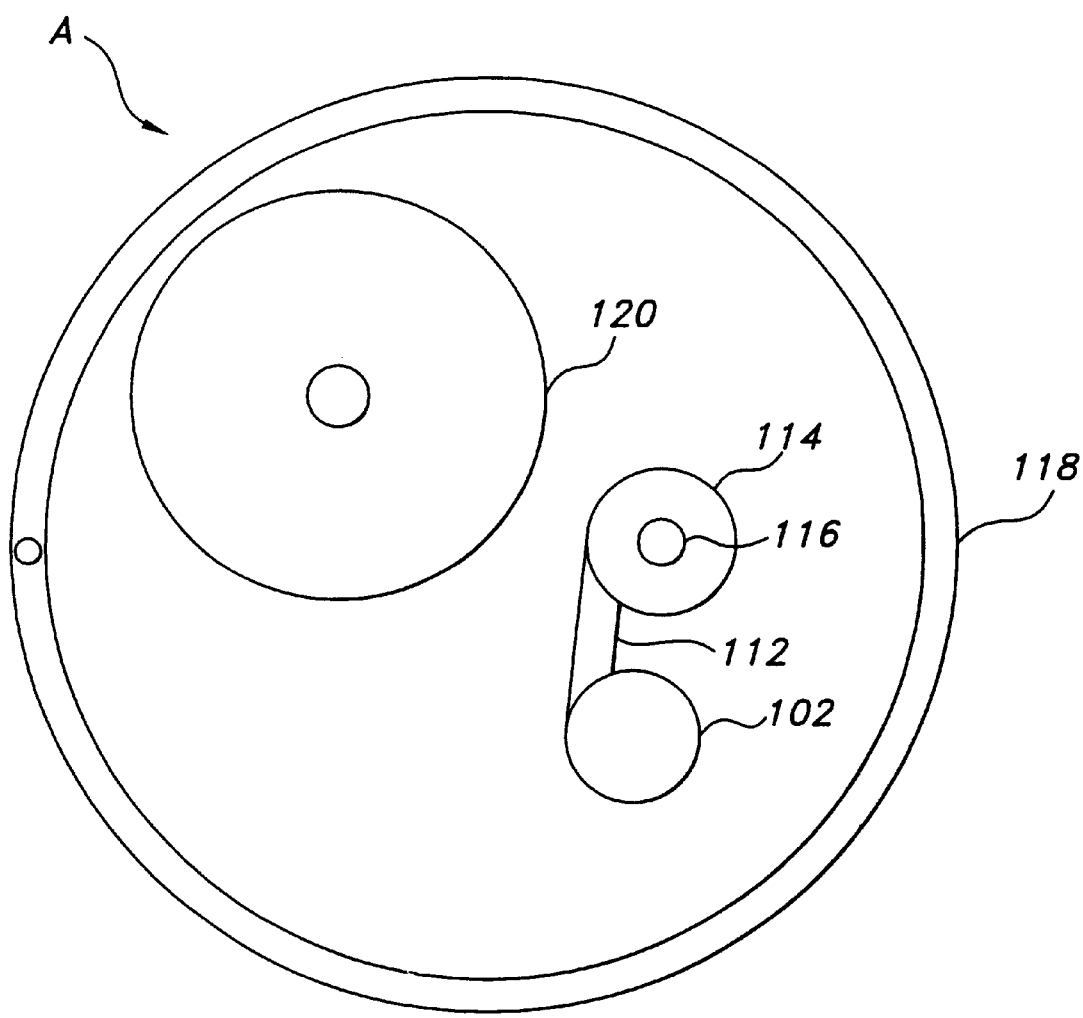
FIG. 3 illustrates an overhead view of the gasifier system of FIG. 2.

A preferred embodiment of the gasifier system A is illustrated in FIG. 2 and FIG. 3. As illustrated, Gasifier 102 is disposed concentrically within combustor 118 and comprises a vessel for providing a non-oxidizing environment wherein gasification reactions can take place. Gasifier 102 includes a biomass feedstock entry opening 106 to allow the introduction of biomass feedstock and a recirculation opening 108 through which hot fluidized inert particulate material may be introduced from combustor 118. A fluidizing gas inlet 110 provides a flow of gas into gasifier 102 to maintain the fluidized state of the particulate material. Gasifier 102 has an exit 112 at or near the top leading to a separator 114 from which product gas is discharged through a product gas exit 116. Entrained char solids may be recycled to the bottom of the gasifier 102 or, preferably, routed to combustor 118 and burned to reheat the inert material. The burning of entrained char in combustor 118 preferably provides most, if not all, of the heat necessary for operation of gasifier 102 under steady-state conditions.

Combustor 118 includes a fluidized bed of the inert particulate material in its lower portion. A conventional gas distribution plate 104 is provided in the lower portion of combustor 118 to provide a flow of air or oxygen that serves both to provide an oxidant to drive combustion reactions, and to fluidize the inert particulate material. Combustor 118 may optionally include a source of combustible gas, such as natural gas or product gas, which can be used as both as a fuel source both during start-up of the combustor and to provide any additional heading necessary to provide sufficient heat to gasifier 102 beyond that which can be produced by the combustion of entrained char. The top portion of combustor 118 includes a separator 120 having an exit 122 for discharging flue gas.

Gasifier 102 is essentially operated as a hybrid with an entrained char zone above a fluidized bed gasifier. Accordingly, it is preferable to operate gasifier 102 at biomass feedstock throughput rates high enough to generate the product gas required to circulate sand and gasified char by entrainment. Additionally, gasifier 102 operates with a recirculating particulate phase, thus requiring inlet gas velocities in the range required to fluidize the sand or other recirculating particulate phase. For example, an inlet gas velocity 0.8 to 2 ft/sec with 20×50 mesh sand has allowed smooth stable operation. However, velocities of 0.5 to 7 ft/sec have also proven sufficient to maintain fluidization. The height of the gasifier 102 should generally be sufficient to permit complete pyrolysis of the upward flowing carbonaceous material at the contemplated throughput rates.

Biomass gasifier system A is operable at biomass feedstock feed rates that preferably exceed 3000 lbs/hr of dry biomass per square foot of reactor cross sectional area and may even more preferably reach a throughput as high as 4400 lbs-ft$^2$/hr. The inlets for biomass feedstock and recirculating inert particulate are located at the base of the reactor in the neighborhood of the gas distributor. As inlet gas flows upwards from the inlet, it maintains fluidity of the inert particulate and assists in the upwards transport of entrained char. Additional gas for maintaining fluidization and transport is also provided from the gasification reaction itself, reducing the requirements for feed gas through the gas distributor.

Gasifier system A is operable at low inlet gas velocity and high feedstock throughputs in excess of 100 lb/ft$^2$-hr and preferably between 500–4400 lb/ft$^2$-hr and with inlet gas velocities of 0.5–7 fl/sec. The use of such low gas inlet velocities serves to reduce the erosion caused by circulation of the inert particulate material, which can be a problem in systems having higher gas inlet velocities.

The method of operating a gasifier according to this invention comprises the steps of introducing into gasifier 102 an inlet gas at a gas velocity generally less than 7 ft/sec, into a bed of high-average-density, inert particulate that has previously been heated in combustor 118. The inlet gas flow servers to fluidize the inert particulate bed in a first space region of gasifier 102 forming a dense fluidized bed. Carbonaceous biomass feedstock is then fed into the first space region at a rate from 100–4400 lbs/ft$^2$-hr and more preferably 500–4400 lbs/ft$^2$-hr. Endothermic pyrolysis of the carbonaceous biomass feedstock is accomplished by means of the heat provided from the circulating heated inert particulate material so as to form a product gas containing at least one of the following: methane, carbon monoxide, carbon dioxide and hydrogen.

Contiguous to and above the dense fluidized bed a lower average density entrained space region is formed containing an entrained mixture of inert solid particles, char and carbonaceous material and the product gas. Because inputted wood or other carbonaceous biomass feedstock is lighter than inert particulates such as sand, the feedstock and any generated char float in the upper region of the fluidized bed. Thus, as the biomass feedstock is gasified by the hot sand, an entrained region of sand, char and carbonaceous particles forms in the upper end of the gasifier 102.

As the carbonaceous particles pyrolyze, they generate gas which increases the gas velocity in the upper region of gasifier 102 to form a high velocity region above the fluidized bed. Despite the relatively low gas inlet velocity into the base of the bed, the gas velocity above the fluidized bed becomes high enough to actually remove particles from the bed and into the exit port of the gasifier. By operating at low inlet gas velocity, high residence time (up to 3 minutes on average) in the reaction vessel can be achieved while still allowing high throughputs of carbonaceous material generating gas to form the entrained region above the fluidized region. Furthermore, the low inlet gas velocity serves to reduce the problems with erosion of system components which can be problematic in higher velocity fluidized bed systems.

The entrained mixture is then removed from the entrained space region of the gasifier 102 to a separator 114 such as a cyclone wherein the entrained mixture of inert solid particles, char and carbonaceous material is separated from the product gas and returned to combustor 118. All system solids are entrained except for unwanted tramp material such as scrap metal inadvertently introduced with the fuel feedstock, for which a separate cleanout provision may be needed.

Residence time of the carbonaceous material in the gasifier 102 typically does not exceed 3 minutes on average. Preferably, the residence time is in the range of 0.5 seconds to 3 minutes. More preferably, the residence time should be in the range of 10–20 seconds and most preferably approximately 15 seconds. At least the inert solid particles are returned to the first space region after passage through an exothermic reaction zone such as a combustor 118 to first heat the inert particles. To facilitate the exothermic reaction, it can be advantageous to route the entire entrained mixture absent product gas through the combustor 118. To further increase the efficiency of the system it is preferable to position the exothermic reaction zone of the combustor 118 to concentrically surround the gasifier 102, thereby reducing heat loss from the exterior surfaces of the gasifier 102.

The carbonaceous material fed to the gasifier 102 can have greater than 60% of the available carbon converted upon a single pass through the gasifier system A. The remainder of the carbon is burned in the combustor 118 to generate heat for the pyrolysis reaction. If other fuel is used in the combustor 118, then additional carbon can be converted in the gasifier 102. With wet fuels, such as municipal waste, carbon conversions might vary upward or downward depending on the operating temperature of the gasifier 102.

The inlet gas fed to the gasifier 102 typically can be steam, recycled-product-gas, combustion by-product gas, inert gases such as nitrogen, or mixtures thereof. Preferred gases for the invention are steam and recycled-product-gas. Addition of other gases such as inert gases or combustion by-product gases generally reduces the efficiency and advantages of the invention. Likewise, the addition of air or oxygen significantly reduces the efficiency and advantages of the invention and should not be used.

Steam is a convenient inlet gas because it is relatively cheap and can be condensed from the product gas prior to distribution. Nitrogen, on the other hand, while allowing the same carbon conversion and the same product gas distribution remains in the product gas as diluent thereby reducing its utilization value in future combustion steps. Air and/or oxygen are not used because they would lead to the undesirable early combustion of the product gas. Combustion in the gasifier itself in unnecessary because the heat to drive the gasification is provided by circulating inert particulate preheated in combustor 118.

As previously described, biomass gasification system A uses the entrainment of char to beneficial advantage and to obtain high carbonaceous feedstock throughputs. Additionally, the efficiency of the system may be further increased by positioning gasifier 102 within the exothermic reaction zone of combustor 118, thereby reducing heat loss from the gasifier 102 to the ambient environment. The commercial advantages of this invention become immediately apparent because higher throughput means higher production levels through the same or smaller sized equipment, thus resulting in a significant reduction in capital costs results from this technology.

The system of the present invention is versatile and could be combined with any type of combustor, fluidized, entrained, or non-fluidized, for heating the inert material as long as the inert particulate material is heated by passage through an exothermic reaction zone of a combustor to add heat. Inert material particulate should be understood to mean relatively inert as compared to the carbonaceous material and could include sand, limestone, and other calcites or oxides such as iron oxide. Some of these "relatively inert materials" actually could participate as reactants or catalytic agents, thus, "relatively inert" is used as a comparison to the carbonaceous materials and is not used herein in a strict or pure qualitative chemical sense as commonly applied to the noble gases. For example, in coal gasification, limestone is useful as a means for capturing sulfur to reduce sulfate emissions. Limestone might also be useful in catalytic cracking of tar in the gasifier 102.

It will be evident to those skilled in the art that start-up of the gasifier 102 for example coupled to a combustor 118 would involve the stages of heat-up and initiation of gasification. These stages could be comprised as follows:

A. Start-Up

Natural gas or some other fuel, such as a wood, is ignited in the combustor 118 and burned at a rate sufficient to increase the combustor 118 temperature at a rate which will not induce spalling of the ceramic lining. Circulation of sand is then initiated between the gasifier 102 and combustor 118 to heat-up the gasifier 102. The gasifier 102 will also be heated by direct heat transfer through the exterior surfaces of the gasifier 102 from the concentrically surrounding combustor 118. During the heat-up stage, air can be used as the transport gas in both gasifier 102 and combustor 118. Gas velocities and wood throughputs in both the gasifier 102 and combustor 118 must be sufficient to entrain the sand to allow for its circulation between gasifier 102 and combustor 118. This generally requires a gas velocity on the order of 15 ft/sec with the sand particle size range employed. The combustion of an auxiliary fuel and circulation of the hot sand is continued until the gasifier 102 reaches the desired temperature (about 1700 to 1800 F.).

B. Initiation of Gasification

After the gasifier 102 reaches the desired temperature range of 1700 to 1800 F., at this time the feed gas to the gasifier 102 is switched from air to steam and then, if desired, to recycle product gas. Biomass feedstock feed is then initiated and gradually increased. As the biomass feedstock gasifies, char is produced and is transported to the combustor 118 where it is burned in place of the start-up fuel. As the biomass feed rate is increased, the feed gas (steam or recycle product gas) to the gasifier 102 is gradually reduced until the system is operating in the range of gas velocities generally not exceeding 7 ft/sec.

A large number of cellulosic type feed materials may be suitable for use in gasification system A, including: agricultural residues, dewatered sewage sludge, municipal solid waste (which is predominantly paper) and fuels derived from municipal solid wastes by shredding and various classification techniques. Peat is also an acceptable feedstock because of its high reactivity, as are lignitic coals. Tests have established that it is possible to convert over 90 percent of the carbon in cellulosic type feed materials. However at these high carbon conversion levels, unless additional energy is available from some other source, there is not sufficient energy in the unconverted carbon to provide the heat for "gasification". Therefore, coal or other volatile containing carbonaceous materials can be used to supplement the cellulosic type feeds because the volatile portion of the coal will be converted to gas and the remaining char will provide sufficient heat to gasify nearly all of the cellulosic feed as well as the volatiles in the coal. Introduction of all these materials can be accomplished by any conventional means such as screw feeders, solid metering valves, or pneumatic conveying.

Whereas this invention has been described in detail with particular reference to its most preferred embodiment, it is understood that variations and modifications can be effected within the spirit and scope of the invention, as described herein before and as defined in the appended claims. The corresponding structures, materials, acts, and equivalents of all means plus function elements, if any, in the claims below are intended to include any structure, material, acts for performing the functions in combination with other claimed elements as specifically claimed.

What is claimed is:

1. A biomass gasification system comprising:
    a combustor for heating a fluidized particulate material; and
    a gasifier disposed to receive a biomass feedstock and heated fluidized particulate material from said combustor wherein said heated fluidized material heats said biomass feedstock to produce a product gas;
    wherein said gasifier is concentrically housed completely within said combustor.

2. The biomass gasification system of claim 1, wherein at least a portion of said biomass feedstock is converted to char in said gasifier and wherein said char is transferred out of said gasifier via entrainment in said fluidized particulate material.

3. The biomass gasification system of claim 2, wherein at least a portion of said char is transferred to said combustor and combusted to heat said fluidized particulate material.

4. The biomass gasification system of claim 1, wherein said product gas is transferred to said combustor and combusted to heat said fluidized particulate material.

5. The biomass gasification system of claim 1 further comprising a biomass feedstock entry opening through which feedstock enters the gasifier, the biomass feedstock entry opening located in proximity to the bottom of the gasifier, wherein said gasifier has a biomass feedstock throughput in the range of approximately 100–4400 lb/ft$^2$-hr.

6. The biomass gasification system of claim 1, wherein said gasifier has a biomass feedstock throughput in the range of approximately 500–4400 lb/ft$^2$-hr.

7. The biomass gasification system of claim 1, wherein said gasifier further receives an inlet gas having an inlet velocity in the range of approximately 0.5 to 7.0 ft/sec.

8. The biomass gasification system of claim 1, wherein said gasifier further receives an inlet gas having an inlet velocity in the range of approximately 0.8 to 2.0 ft/sec.

9. A biomass gasification system comprising:
  a combustor for bearing a fluidized particulate material; and
  a gasifier disposed to receive a biomass feedstock and heated fluidized particulate material from said combustor;
  wherein said heated fluidized material heats said biomass feedstock to produce a product gas;
  wherein said gasifier is concentrically housed completely within said combustor; and
  wherein said biomass feedstock has an average residence time in said gasifier of in the range of approximately 0.5 seconds to 3 minutes.

10. The biomass gasification system of claim 9, wherein said biomass feedstock has an average residence time in said gasifier of in the range of approximately 10–20 seconds.

11. A biomass gasification method comprising the steps of:
  heating a fluidized particulate material in a combustor;
  transferring the heated fluidized particulate material to a gasifier; and
  introducing a feedstock to the gasifier, wherein heat from said fluidized particulate material causes the gasification of at least a portion of said feedstock to form a product gas;
  wherein said gasifier is concentrically housed completely within said combustor.

12. The biomass gasification method of claim 11, further including the step of
  causing said fluidized particulate material to form a higher density region in the lower portion of said gasifier and a lower density region in the upper portion of said gasifier.

13. The biomass gasification method of claim 12, further including the steps of:
  forming an entrained mixture in said lower density region, wherein said entrained mixture includes a mixture of said fluidized particulate material, char formed from the gasification of said biomass feedstock, and product gas;
  continuously removing said entrained mixture from said lower density region to a separator;
  separating the particulate material and char from said product gas; and
  combusting said char in said combustor to produce heat.

14. The biomass gasification method of claim 11, further including the step of combusting at least a portion of said product gas in said combustor to produce heat.

15. The biomass gasification method of claim 11, wherein said gasifier has a biomass feedstock throughput in the range of approximately 100–4400 lb/ft$^2$-hr.

16. The biomass gasification method of claim 11, wherein said gasifier has a biomass feedstock throughput in the range of approximately 500–4400 lb/ft$^2$-hr.

17. The biomass gasification method of claim 11, further including the step of introducing an inlet gas to said gasifier at an inlet velocity in the range of approximately 0.5 to 7.0 ft/sec.

18. The biomass gasification method of claim 11, further including the step of introducing an inlet gas to said gasifier at an inlet velocity in the range of approximately 0.8 to 2.0 ft/sec.

19. The biomass gasification system of claim 11, wherein said biomass feedstock has an average residence time in said gasifier of in the range of approximately 0.5 seconds to 3 minutes.

20. The biomass gasification system of claim 11, wherein said biomass feedstock has an average residence time in said gasifier of in the range of approximately 10–20 seconds.

* * * * *